(12) United States Patent
Zhao et al.

(10) Patent No.: US 8,948,179 B2
(45) Date of Patent: Feb. 3, 2015

(54) METHOD OF MULTIPROTOCOL LABEL SWITCHING ENCAPSULATION FOR UNITED ROUTER FARM FORWARDING

(75) Inventors: Katherine Zhao, San Jose, CA (US); Renwei Li, Fremont, CA (US); Lin Han, San Jose, CA (US); Shujin Zhang, San Carlos, CA (US); Xiaoqian Wu, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 219 days.

(21) Appl. No.: 13/591,038

(22) Filed: Aug. 21, 2012

(65) Prior Publication Data

US 2014/0056300 A1    Feb. 27, 2014

(51) Int. Cl.
*H04L 12/28* (2006.01)
*H04L 12/56* (2006.01)
*H04J 3/16* (2006.01)
*H04J 3/22* (2006.01)

(52) U.S. Cl.
USPC .......................................... 370/392; 370/466

(58) Field of Classification Search
CPC ............... H04L 12/4633; H04L 29/12575; H04L 29/0653; H04L 45/16; H04L 49/3009; H04W 28/065; H04W 76/022; H04W 80/02; H04B 7/2606
USPC ................. 370/389–392, 465, 466, 474, 476
See application file for complete search history.

(56) References Cited

U.S. PATENT DOCUMENTS

| | | | | |
|---|---|---|---|---|
| 6,163,843 | A * | 12/2000 | Inoue et al. ...................... | 726/11 |
| 7,406,330 | B2 * | 7/2008 | McConnell et al. ........ | 455/554.1 |
| 7,852,754 | B2 * | 12/2010 | Khanna et al. ................. | 370/222 |
| 8,249,057 | B1 * | 8/2012 | Mohaban et al. ............. | 370/352 |
| 2007/0112975 | A1 * | 5/2007 | Cassar ............................ | 709/239 |
| 2007/0266143 | A1 * | 11/2007 | Zeng et al. ..................... | 709/224 |
| 2009/0170607 | A1 * | 7/2009 | Chiao et al. ..................... | 463/42 |
| 2010/0098072 | A1 * | 4/2010 | Satterlee et al. .............. | 370/389 |
| 2011/0267854 | A1 * | 11/2011 | Flannery et al. ................ | 363/72 |

OTHER PUBLICATIONS

Listanti, M., Eramo, V., Sabella, R.—"Architectural and technological issues for future optical Internet networks" Communications Magazine, IEEE vol. 38, Issue: 9; pp. 82-92; Sep. 2000 and Aug. 2002.*
Agrawal, M. et al—"RouterFarm: towards a dynamic, manageable network edge" INM '06 Proceedings of the 2006 SIGCOMM workshop on Internet network management, pp. 5-10; Sep. 2006.*
Han, Lin, et al., U.S. Appl. No. 13/463,692, Title:"United Router Farm Setup," filed May 3, 2012, Specification 44 pages, 16 Drawing Sheets (Figs. 1A, 1B; 1C; 1D; 2; 3A; 3B; 4A; 4B; 5A; 5B; 6A; 6B; 7A; 7B; 8A; 8B; 8C; 8D; 8E; 8F; and 9).
Cisco, "Cisco Network Virtualization," http://cisco.com/en/US/netsol/ns658/networking_solutions_package.html, Cisco Systems, Inc., 2006, 4 pages.

* cited by examiner

*Primary Examiner* — Xavier Szewai Wong
(74) *Attorney, Agent, or Firm* — Conley Rose, P.C.; Grant Rodolph; Brandt D. Howell

(57) ABSTRACT

A network component for supporting packet forwarding in a United Router Farm (URF), the network component comprising a processor configured to receive a packet, encapsulate the packet using a URF header comprising a URF Layer Two (L2) header that indicates Media Access Control (MAC) addresses of current and next hops, an outer label that indicates a tunnel to a destination node in the URF, and an inner label that indicates an egress port on the destination node, and send the packet to a next hop in the URF after encapsulating the packet.

22 Claims, 9 Drawing Sheets

METHOD OF MULTIPROTOCOL LABEL SWITCHING ENCAPSULATION FOR UNITED ROUTER FARM FORWARDING

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communications and data networks are comprised of nodes that transport data through the network. The nodes may include routers, switches, bridges, or combinations thereof that transport the individual data packets or frames through the network. Some networks may offer data services that forward data frames from one node to another node across the network without using pre-configured routes on intermediate nodes. Other networks may forward the data frames from one node to another node across the network along pre-configured or pre-established paths. Some networks implement a routing or switching network constructed using network virtualization and clustering technology, such as a United Router Farm (URF).

A URF comprises a set of routers or switches that are clustered together using network virtualization technology. The URF is an autonomous system in which a master router is in charge of the routing control functionality for other routers (or switches) in the cluster, so that the remaining routers may implement simpler logic and have lower cost. In a URF, a plurality of access nodes may be each connected to one or more aggregation nodes. The aggregation nodes may be configured as the master nodes and the access nodes may serve as the slave nodes. The master nodes perform routing functionalities, and calculate and distribute forwarding tables to the slave nodes. The slave nodes may serve as remote line cards for the master nodes that have a simplified forwarding engine, since their routing functionality is offloaded to the master nodes. A URF comprising hundreds or thousands of nodes can be viewed as a single logical router, which simplifies packet forwarding, management, and provisioning processes in the network. The logical router (or URF) can also improve network scalability by providing node plug-and-play with zero or minimal configuration, which may reduce capital expenditure (capex) and operating expenditure (opex).

The URF scheme separates the control plane and the data plane where the slave node behaves as a remote line card of the master node. The forwarding engine on the slave is controlled at the master node via a routing protocol stack. This is different from traditional routers in which the control plane and the data plane are collocated (at the same node or box) and may communicate over a Peripheral Component Interconnect (PCI) bus in the same box. Thus, existing mechanisms and protocols for traditional routers are not suitable for the URF architecture to control packet forwarding reliably and efficiently in the network.

One approach introduced to control packet forwarding in a URF is using a virtual local area network (VLAN) with a proprietary protocol from Cisco™ for packet forwarding. The VLAN approach may comprise using VLAN tags in the packets to forward the packets in the URF. However, this approach requires direct connectivity between master and slave nodes, and thus does not work for some topologies, such as a ring topology. Another restriction is that the VLAN does not allow more than about 4,000 VLAN tags in a network, which limits network scalability. This VLAN approach restricts the application for use in networks with a hub and spoke topology but not the ring topology. Thus, this VLAN scheme is not used in widely deployed ring topology based networks.

SUMMARY

In one embodiment, the disclosure includes in a master node of a United Router Farm (URF), a method of packet forwarding comprising receiving a packet, adding a URF header to the packet that indicates a URF type packet, a next hop in the URF, a tunnel to a destination slave node, and a port of the destination slave node, and forwarding the packet to a next hop on the tunnel after adding the URF header.

In another embodiment, the disclosure includes in a slave node of a United Router Farm (URF), a method of packet forwarding comprising receiving a packet, adding a URF header to the packet that indicates a URF type packet, a next hop in the URF, a tunnel to a master node, and a port of the master node, and forwarding the packet to a next hop on the tunnel after adding the URF header.

In yet another embodiment, the disclosure includes A network component for supporting packet forwarding in a URF, the network component comprising a processor configured to receive a packet, encapsulate the packet using a URF header comprising a URF Layer Two (L2) header that indicates Media Access Control (MAC) addresses of current and next hops, an outer label that indicates a tunnel to a destination node in the URF, and an inner label that indicates an egress port on the destination node, and send the packet to a next hop in the URF after encapsulating the packet.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
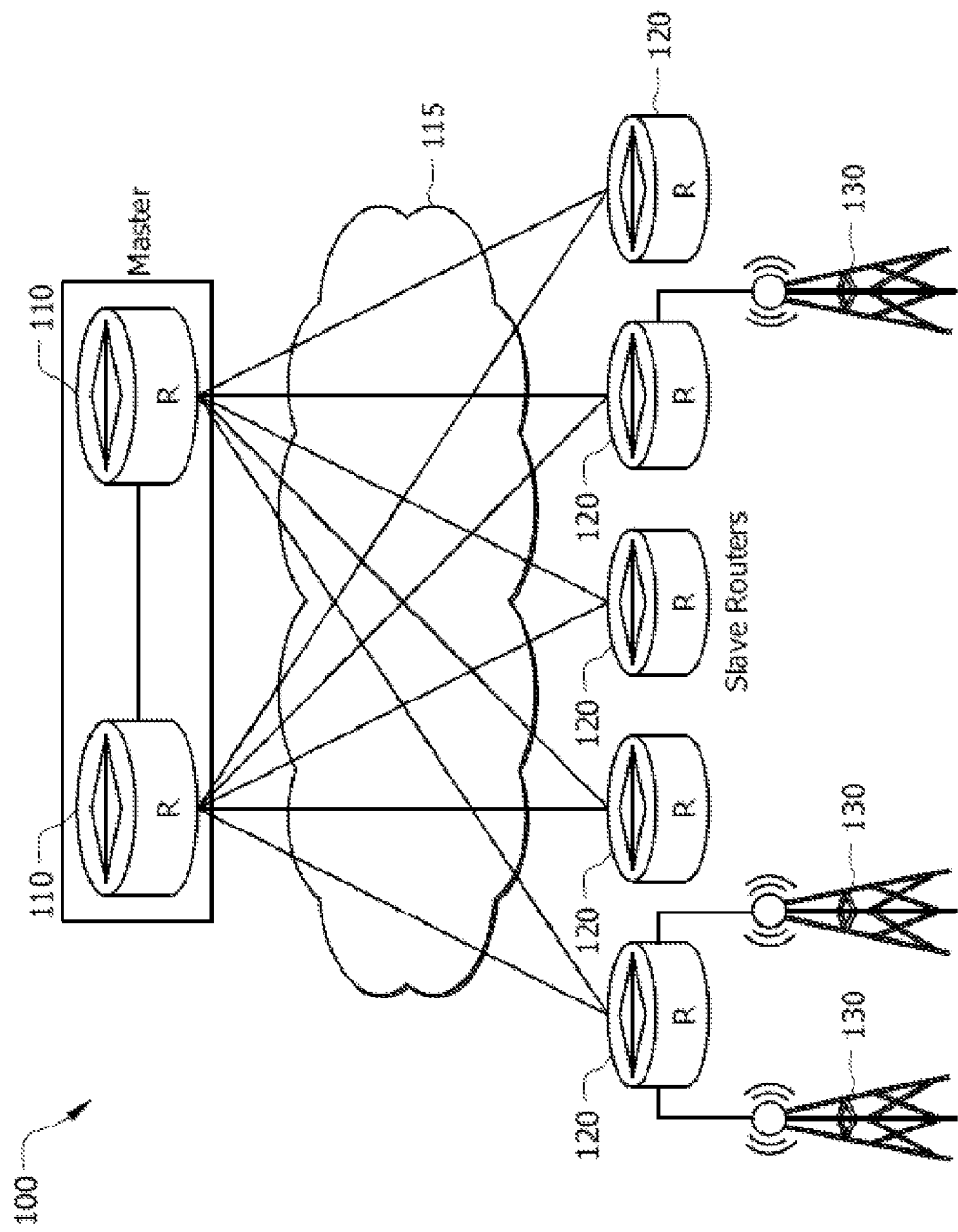
FIG. 1 is a schematic diagram of a URF hub and spoke topology.

FIG. 1 illustrates a general URF hub and spoke topology 100, which may be used for some networks, data centers, or Internet Protocol (IP) Radio Access Networks (RANs). The URF hub and spoke topology 100 may comprise one or more master nodes 110 (e.g., two master nodes 110), which may be each coupled to one or more slave nodes 120. The master nodes 110 may be arranged or grouped in a master cluster and coupled to each other via one or more links. The master nodes 110 may be any network nodes, such as routers, switches, bridges, or other appropriate components that are configured to send and receive packets in a network. The master nodes 110 may be in charge of the routing control functionality for the slave nodes 120 in the URF, so that the slave nodes 120 may implement simpler logic to forward the packets. This may comprise performing routing functionalities, and calculating and distributing forwarding tables to the slave nodes. The slave nodes 120 may be network nodes, such as routers, switches, or other appropriate components that are configured to send and receive packets in a network.

The slave nodes 120 may serve as remote line cards of the master nodes 110 that have a simpler forwarding engine than the master nodes 110, and hence may have lower cost. The master nodes and the slave nodes 120 may be configured as described in U.S. patent application Ser. No. 13/463,692 (Lin Han et al.) filed May, 3, 2012 by Lin Han et al. and entitled "United Router Farm Setup," which is incorporated herein by reference as if reproduced in its entirety. In the URF hub and spoke topology 100, the slave nodes 120 may be directly coupled to a corresponding master node 120, and thus packets may be exchanged directly between a master node 110 and a corresponding slave node 120 (in either direction) without passing by a third node (e.g., another slave node 120). The slave nodes 120 may also be coupled to a plurality of base stations (BSs) 130 in one or more IP RANs, where each BS 130 may forward data between the slave nodes 120 and one or more customer nodes or user equipment (UE), e.g., mobile phones (not shown).

Figure 2:
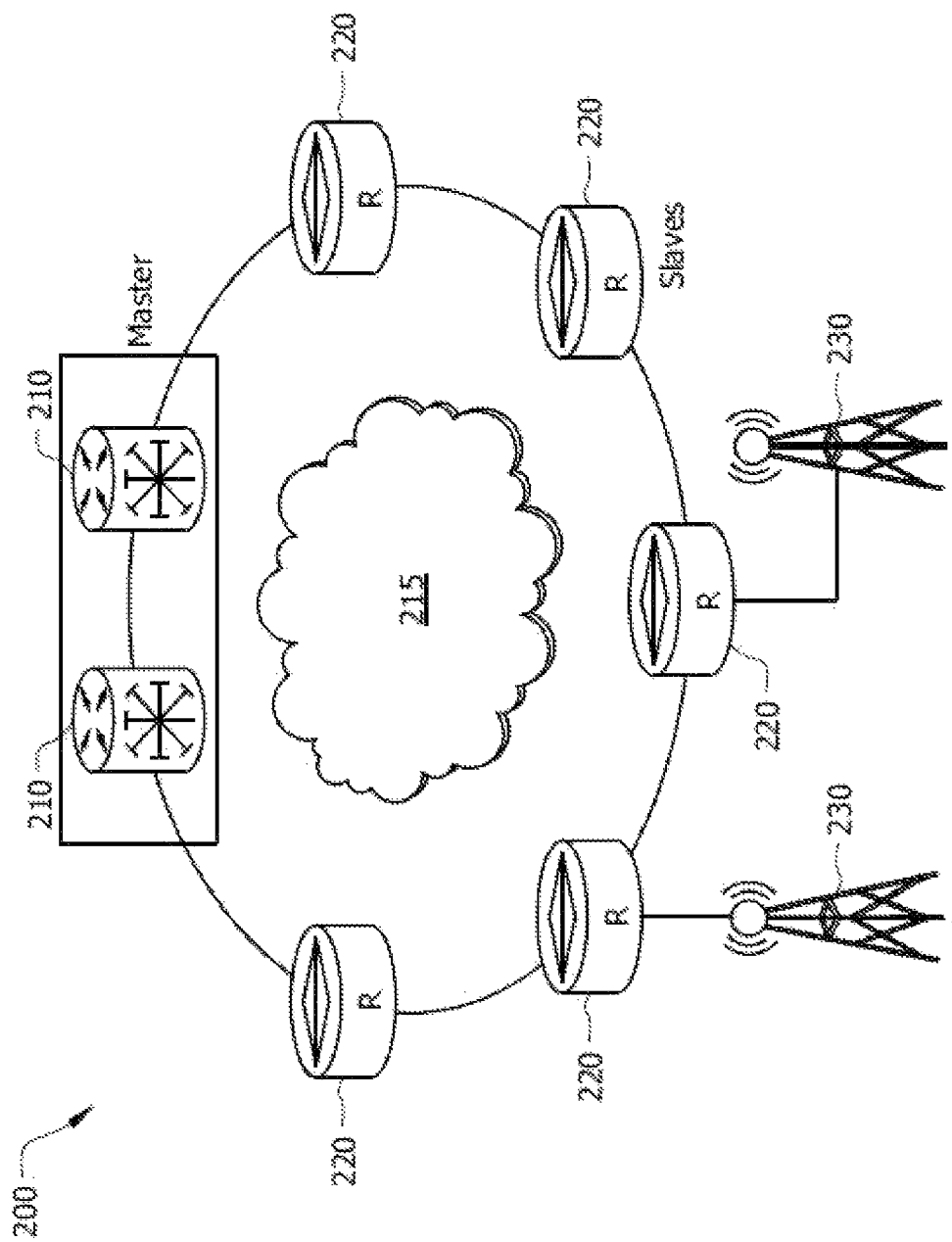
FIG. 2 is a schematic diagram of a URF ring topology.

FIG. 2 illustrates a general URF ring topology 200, which may also be used for IP RANs. The URF ring topology 200 may comprise one or more master nodes 210 (e.g., two master nodes 210), which may be each coupled to one or more slave nodes 220 in a ring. The master nodes 210 may also be coupled to each other via the same ring. The master nodes 210 may be configured similar to the master nodes 110. The slave nodes 220 may be arranged and distributed along the ring, where the master nodes 210 may be grouped in a master cluster, as shown in FIG. 2. The slave nodes 220 may be configured similar to the slave nodes 120. In the URF ring topology 200, the master nodes 210 and the slave nodes 220 may exchange packets in their corresponding order along the ring, where the packets may be forwarded between a master node 210 to a non-adjacent slave node 220 (in either direction) via one or more intermediate nodes along the ring. The slave nodes 220 may also be coupled to a plurality of BSs 130 in one or more IP RANs. Each BS 230 may communicate with the slave nodes 220 and one or more customer nodes or UE, e.g., mobile phones (not shown).

Figure 3:
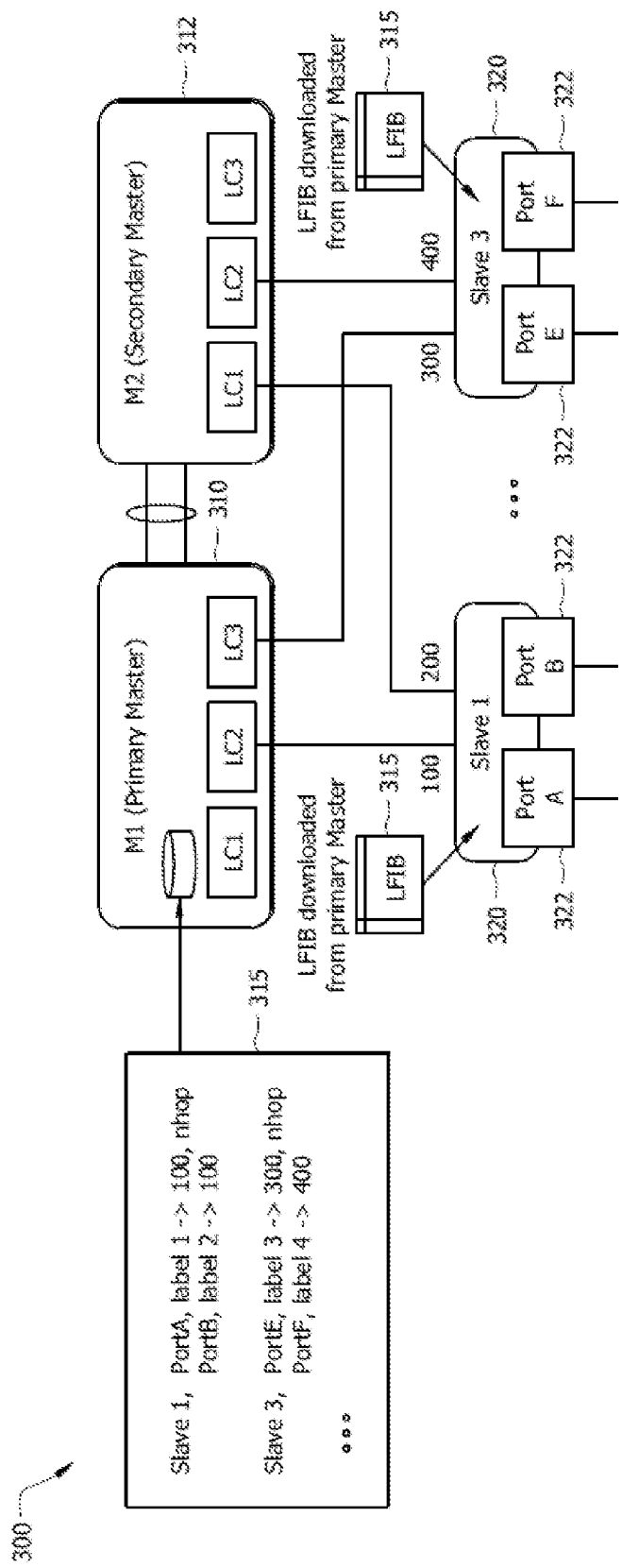
FIG. 3 is a schematic diagram of a URF setup scheme.

FIG. 3 illustrates a typical URF setup scheme 300, which may be implemented to set up a URF and configure URF master nodes and slave nodes accordingly. The URF setup scheme 300 may be described in Lin Han et al. The URF may comprise a primary master node 310 and a secondary master node 312, which may serve as a backup for the primary master node 310 in case the primary master node 310 or a link to the primary master node 310) fails. The primary master node 310 may be coupled to a plurality of slave nodes 320, for example three slave nodes 320 (labeled Slave 1 . . . Slave 3). The secondary master node 312 may also be coupled to the slave nodes 320. The primary master node 310 and similarly the secondary backup slave node 320 may comprise a plurality of line cards (labeled LC1, LC2, and LC3), which may be coupled to corresponding slave nodes 320. A line card (LC) may be coupled to one corresponding slave node 320. The slave nodes 320 may each comprise a plurality of ports 322, which may be coupled to other network components outside the URF, such as BSs in IP RANs.

Upon the URF setup, the slave nodes 320 may register with the primary master node 310 and report their port information and adjacent node information to the primary master node 310. The primary master nodes 310 may assign a plurality of port identifiers (IDs) that distinguish the ports 320 (e.g., Port A, Port B . . . Port E, and Port F). During the URF setup, a plurality of Multiprotocol Label Switching (MPLS) tunnels may also be established between the LCs of the primary master node 310 (and similarly second master node 312) and corresponding uplink interfaces of the slave nodes 320. The primary master node 310 may assign a plurality of tunnel IDs that distinguish the corresponding tunnels. The combinations of port IDs and tunnel IDs may uniquely identify the remote interfaces in the URF (at the slave nodes 320). The primary master node 310 may assign to the tunnels a plurality of corresponding labels, which may be forwarded in URF associated packets. The labels may serve as tunnel IDs. Each of the tunnels may be assigned a unique label that is added to the packet forwarded on the tunnel. For example, a first label (e.g., label 1) of value 100 may be assigned to a first tunnel for Slave 1, a second label (e.g., label 2) of value 200 may be assigned to a second tunnel for Slave 1, a third label (e.g., label 3) of value 300 may be assigned to a third tunnel for Slave 3, and a fourth label (e.g., label 4) of value 400 may be assigned to a fourth tunnel for Slave 3.

The primary master node 310 may maintain MPLS routing information for all the slave nodes 320. The routing information may include the port IDs, the tunnel IDs (the labels associated with the tunnels). The primary master node 310 may maintain a plurality of entries or mappings between the slave nodes 320, the corresponding port IDs, and the labels associated with the corresponding tunnels. For example, for Slave 1, Port A may be mapped to label 1 of value 100, and Port B may be mapped to label 2 of value 200. For Slave 2, Port E may be mapped to label 3 of value 300, and Port F may be mapped to label 4 of value 400. The mappings may be maintained in a Label Forward Information Base (LFIB) 315. The mappings may also indicate whether a slave node 320 is a next hop to the primary master node 310, i.e., is directly linked to the primary master node 310 via a tunnel. The LFIB 315 may be downloaded from the primary master node 310 to the secondary master node 312 and all the slave nodes 320 of the URF. The slave nodes 320 may use the information in the LFIB 315 and the labels in the packets to forward the URF associated packets properly.

Disclosed herein are systems, methods, and apparatuses for packet forwarding between master nodes and slave nodes in a URF using MPLS encapsulation. The systems, methods, and apparatuses may use a URF header encapsulation/decapsulation scheme in the packets to enable and facilitate packet forwarding between the master nodes and the slave nodes in the URF. The packets may be encapsulated with a URF header based on MPLS, which may comprise a L2 header, an outer label, and an inner label. The L2 header may specify the packet type and the sender and next hop for the packet in the URF, the outer label may specify a MPLS tunnel established between a master node and one or more slave nodes in the URF, and the inner label may specify a destination port on a slave node. A packet entering a URF may be encapsulated with a URF header, which may be processed by the slave nodes of the URF to properly forward the packet without processing IP or Layer Three (L3) addresses. The packet may then be decapsulated by removing the URF header when the packet leaves the URF.

These aspects may be used by different vendors of products (e.g., routers or switches) that may be used for a URF and may not have the scalability and topology limitations of a VLAN approach for forwarding packets in a URF. Further, these aspects may be implemented for different topologies, including a hub and spoke topology and a ring topology that is not supported by the VLAN approach. Thus, URF header encapsulation/decapsulation for forwarding URF associated packets disclosed herein is suitable for use in IP RANs, for example, that typically use the ring topology.

For instance, in a URF ring topology (e.g., topology 200), and similarly in a URF hub and spoke topology (e.g., topology 100), a URF header encapsulation/decapsulation scheme may be implemented that uses MPLS to forward packets in the URF. Accordingly, the master nodes 210 and the slave nodes 220, and similarly the master nodes 110 and the slave nodes 120, may be configured to encapsulate the packets based on the MPLS protocol. Specifically, a URF header may be added to incoming packets in the URF (e.g., at a master node 210 or a slave node 220). The URF header may then be updated by the next hops to properly forward the packets in the URF. The URF header may then be removed from the packets (e.g., at a slave node 210 or a master node 220) before the packets exit the URF. The MPLS encapsulation based packet forwarding scheme in the URF may support different topologies and have improved scalability, e.g., in comparison to a VLAN approach or other forwarding schemes or protocols.

Figure 4:
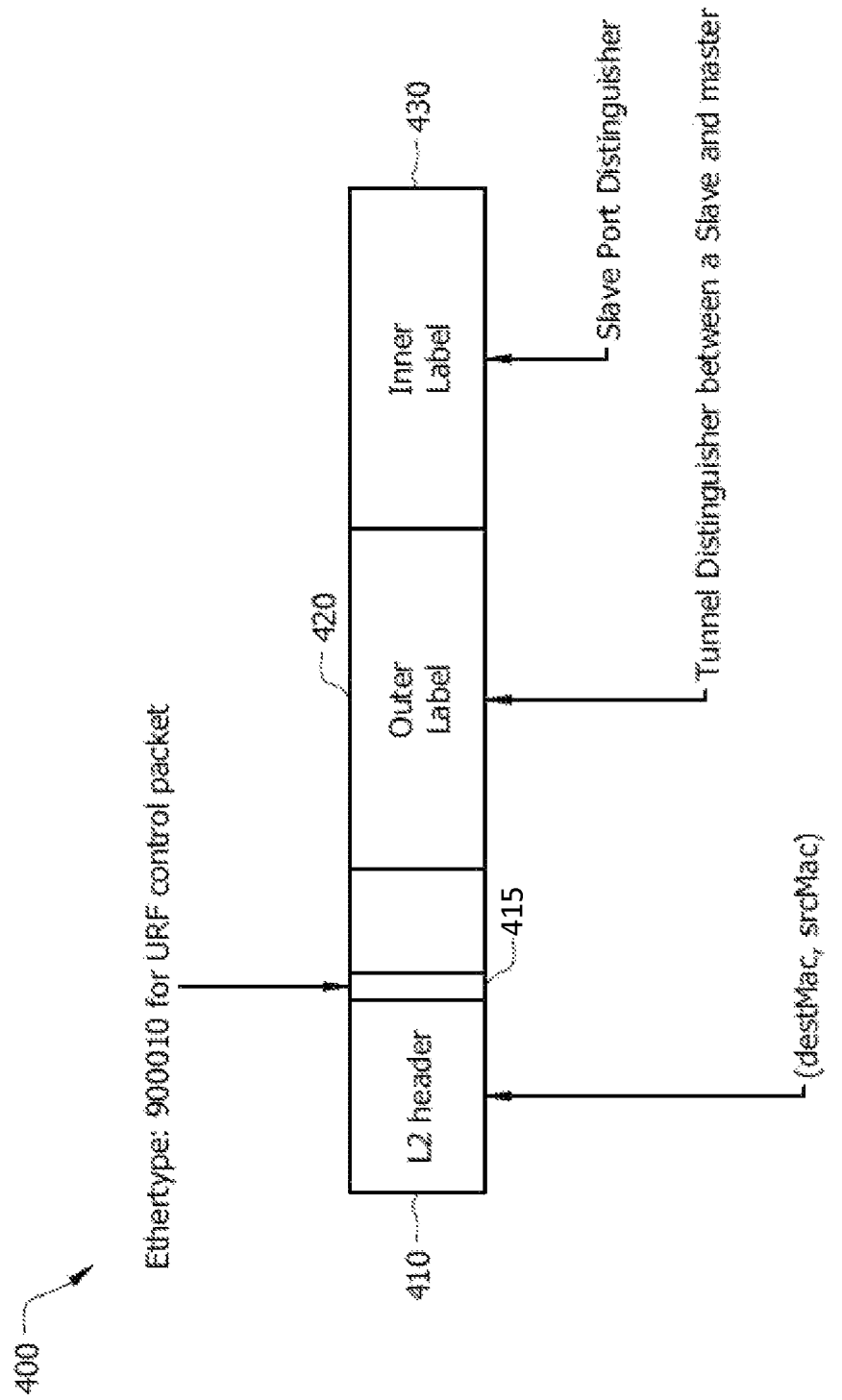
FIG. 4 is an illustration of a URF header according to an embodiment of the disclosure.

FIG. 4 illustrates a URF header 400, which may be added to packets forwarded in a URF according to an embodiment of the disclosure. The URF may have a URF ring topology, such as the URF ring topology 200, a URF hub and spoke topology, such as the URF hub and spoke topology 100, or other suitable topologies. The URF header 400 may be added using MPLS encapsulation to packets in the URF to forward the packets properly between a master node and a slave node or between two slave nodes, e.g., via one or more master and/or slave nodes. The URF header in the packets may be updated by intermediate nodes in the URF (e.g., one or more slave nodes and master nodes) to properly forward the packets to the next hops without using IP addresses. The URF header 400 may comprise a L2 header 410, an outer label 420, and an inner label 430.

The L2 header 410 may be configured based on MPLS and comprise a destination MAC address and a source MAC address that indicate the packet sender and receiver, respectively, at each hop. The L2 header 410 may also comprise an Ethernet type (or Ethertype) 415 that is set to indicate a URF associated packet. For example, the Ethertype 415 in the L2 header 410 may be set to 900010 or other available value, which may be registered with the Internet Assigned Numbers Authority (IANA) and approved by the Institute of Electrical and Electronics Engineers (IEEE) for this purpose. This may indicate that the packet is received from a URF internal interface, e.g., from a master node or a slave node associated with the URF, and distinguish such packet from other packets that may not be URF associated packets, such as other MPLS or IP packets transmitted within the network. Using the Ethertype 415 in the L2 header 410 may reduce table lookups by the nodes of the URF. Based on the Ethertype 415, the URF node (a master or slave node) may associate a URF internal packet with L2 header processing, and hence redirect the packet to a URF internal master slave control protocol (MSCP) logic (implemented in the node) as described in Lin Han et al., which may speed up packet processing and forwarding.

The outer label 420 may be configured using a tunnel distinguisher or ID that designates a tunnel which extends between the interfaces at a slave node and a master node. The outer label 420 may comprise a value that distinguishes one of the tunnels established between the slave nodes and the master nodes in the URF. The tunnel may pass by one or more intermediate nodes of the URF. The inner label 430 may be configured using a port distinguisher or ID that designates a port on a slave node. The inner label 420 may comprise a value that distinguishes one of the ports on one of the slave nodes in the URF. Thus, the combination of the outer label 420 and the inner label 430 may distinguish a port on a slave node on a tunnel for forwarding a packet in the URF, as described below.

Figure 5:
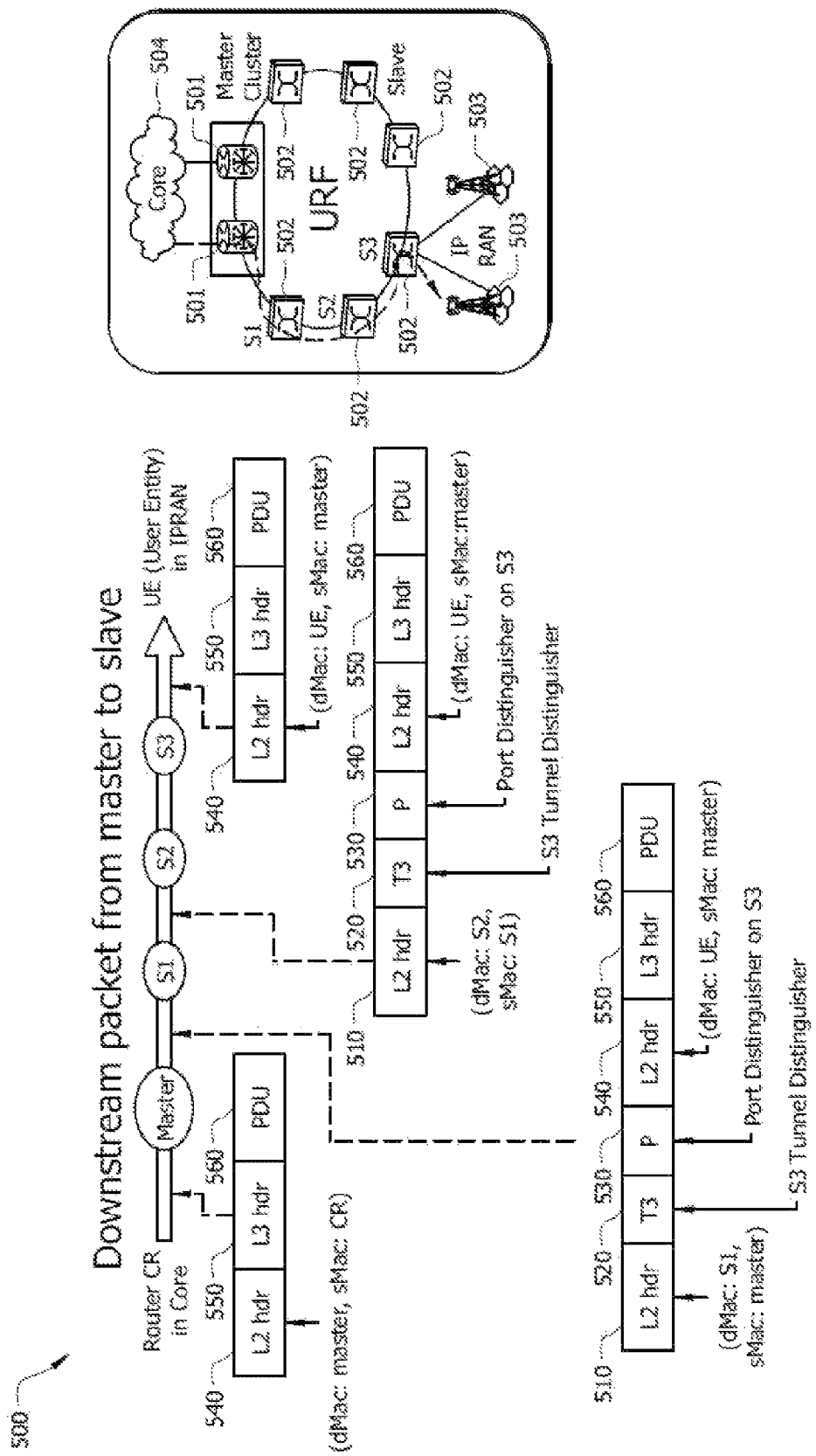
FIG. 5 is an illustration of a URF header encapsulation scheme for downstream packets according to an embodiment of the disclosure.

FIG. 5 illustrates a URF header encapsulation scheme 500 according to an embodiment of the disclosure. The URF header encapsulation scheme 500 may be used for forwarding packets downstream from a master node 501 to a slave node S3 502, e.g., via intermediate slave nodes S1 502 and S2 502. The cluster of master nodes 501 and the slave nodes 502 of the URF may be arranged in a ring topology, as shown in FIG. 5. The master nodes 501 and the slave nodes 502 may be position along a ring, where a single tunnel may be established that passes through all the URF nodes along the ring. The URF header encapsulation scheme 500 may also be implemented for other URF topologies, such as the hub and spoke topology. Initially, a packet may be received at a master node 501, e.g., in a cluster of master nodes 501 of the URF. The downstream packet may be received from a core network 504 coupled to or comprising the master node 501. The packet may be intended for a BS 503 in an IP RAN coupled to one of the slave nodes 502 (S3) via a corresponding port of S3. S3 may be coupled to one or more BSs 503 in the IP RAN via one or more corresponding ports. The packet may be designated for a customer node or UE, which may be a mobile phone or a wireless communications device in the IP RAN, coupled to the intended BS 503 (the UE is not shown).

The packet sent downstream from the core network 504 to the master node 501 may comprise a L2 header 540, a L3 header 550, and a protocol data unit (PDU) 560, which may be configured according to the Ethernet protocol. The L2 header 540 may comprise a destination MAC address corresponding to the master node 501 and a source MAC address corresponding to a core router (CR) in the network. The L2 header 540 may also comprise an Ethertype field that specifies the type of the packet, e.g., a MPLS packet or an IP packet. The L3 header 550 may comprise source and destination IP addresses for the packet. The PDU 560 may comprise data.

Upon receiving the packet, the master node 501 may inspect the Ethertype in the L2 header 540 to determine whether the packet is a URF packet or otherwise (e.g., MPLS or IP packet). If the Ethertype is not for URF, then the master node 501 may encapsulate the packet by adding a URF header to the packet, e.g., similar to the URF header 400. For example, the packet may correspond to IP traffic, MPLS traffic, Time Division Multiplexing (TDM) traffic, or any other network traffic transported via Ethernet or similar packets. Processing the URF header components at the URF nodes may require simpler logic and maintaining less forwarding information than processing the L2/L3 headers of the received packet. Thus, adding the URF header to the packet may simplify the routing and forwarding logic at the subsequent nodes along the tunnel and reduce the amount of forwarding information maintained at the nodes (e.g., in the local LFIBs).

The URF header may comprise a second L2 header 510, an outer label 520, and an inner label 530, which may be inserted in the packet. The second L2 header 510 may comprise a source MAC address that indicates the master node 501. The second L2 header 510 may also comprise a destination MAC address that indicates a next hop for forwarding the packet. The next hop may be an intermediate slave node 502 (S1) along the tunnel from the master node 501 to the slave node 502 intended for the packet (S3). The intended slave node 501 (S3) may be coupled to the BS 503 that serves the customer node or UE that the packet is designated for. The master node 501 may identify the BS 503 and thus S3 based on the destination IP address in the L3 header 550 that indicates the UE. The outer label 520 may comprise a tunnel distinguisher (or ID) that specifies the tunnel extending between the master node 501 and the intended slave node 502 (S3). In this URF ring topology, a single tunnel ID that defines a single tunnel (along the ring) may be used in the outer label 520 to forward the packet along the ring. The inner label 530 may comprise a port distinguisher (or ID) that specifies a port on S3 that is coupled to the BS 503 intended for the packet.

Further, the master node 501 may update the L2 header 540 in the packet to indicate a destination MAC address corresponding to the UE that the packet is designated for and a source MAC address corresponding to the master node 501. The L3 header 550 and the PDU 560 may not be changed. The master node 501 may then forward the packet to the next hop, S1. S1 may receive the packet and encapsulate the packet by inserting a URF header with new values in the packet. Specifically, the second L2 header 510 may comprise a new destination MAC address that indicates the next hop for forwarding the packet and a new source MAC address that indicates S1. S1 may use a local LFIB to process the second L2 header 510. The next hop may be a second intermediate slave node 502 (S2) along the tunnel from the master node 501 to S3. The outer label 520 and the inner label 530 in the second L2 header 510 may remain the same. S1 may not process or modify the L2 header 540, the L3 header 550, and the PDU 560. S1 may then send the packet to the next hop, S2, which may process the packet similar to S1. Thus, S2 may encapsulate the packet with a new URF header by modifying the destination and source MAC addresses in the second L2 header 510 without the outer label 520 and the inner label 530. S2 may also leave the L2 header 540, the L3 header 550, and the PDU 560 intact. When the packet is received at the intended slave node 503, S3, the packet may be decapsulated by removing the URF header including the second L2 header 510, the outer label 520, and the inner label 530. S3 may examine the URF header and determine based on the inner label 530 that the packet has reach the intended port. The packet may then be sent to the BS 502 associated with the designated port in the inner label 530.

The URF header encapsulation scheme 500 may be implemented similarly for a URF arranged in a hub and spoke topology. In the a hub and spoke topology, the downstream packet may be sent from a master node to the intended slave node directly (without passing through intermediate nodes) and subsequently forwarded to a BS associated with the designated port in the inner label.

Figure 6:
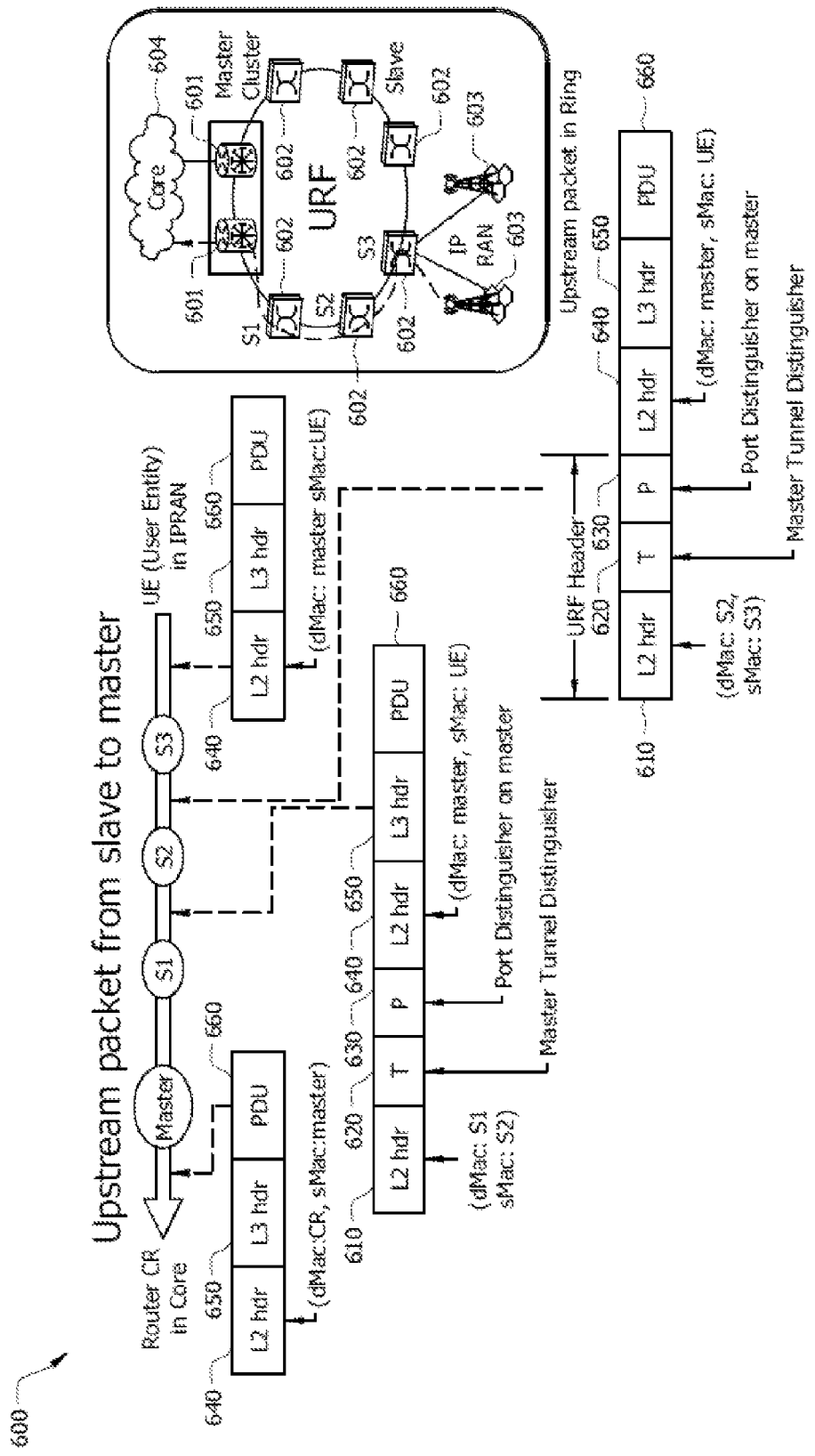
FIG. 6 is an illustration of a URF header encapsulation scheme for upstream packets according to an embodiment of the disclosure.

FIG. 6 illustrates a URF header encapsulation scheme 600 according to an embodiment of the disclosure. The URF header encapsulation scheme 600 may be used for forwarding packets upstream from a slave node 602 to a master node 601, e.g., via intermediate slave nodes 601. The cluster of master nodes 601 and the slave nodes 602 of the URF may be arranged in a ring topology, as shown in FIG. 6. The URF header encapsulation scheme 600 may also be implemented for other URF topologies, such as the hub and spoke topology. Initially, a packet may be received by one of the slave nodes S3 602 from a BS 603 in an IP RAN via a corresponding port of S3 602. S3 602 may be coupled to one or more BSs 603 in the IP RAN via one or more corresponding ports. The upstream packet may be sent from a UE (not shown), which may be a customer in the IP RAN, coupled to the BS 603. The packet may be intended to a CR in a core network 604 coupled to the master node 601.

The packet sent upstream from the UE to S3 may comprise a L2 header 640, a L3 header 650, and a PDU 660, which may be configured according to the Ethernet protocol. For example, the packet may correspond to IP traffic, MPLS traffic, TDM traffic, or any other network traffic transported via Ethernet or similar packets. The L2 header 640 may comprise a destination MAC address corresponding to the master node 601 and a source MAC address corresponding to the UE. The L3 header 650 may comprise source and destination IP addresses for the packet. The PDU 660 may comprise data.

Upon receiving the packet, S3 may recognize that the packet is received from outside the URF based on the L2 header 640 (the Ethertype). S3 may also be aware of the master node 601 during the URF setup phase. S3 may encapsulate the packet by adding a URF header to the packet, e.g., similar to the URF header 400, before forwarding the packet on the tunnel to the master node 601. The URF header may comprise a second L2 header 610, an outer label 620, and an inner label 630, which may be inserted in the packet. The second L2 header 610 may comprise a source MAC address that indicates S3. The second L2 header 610 may also comprise a destination MAC address that indicates a next hop for forwarding the packet. The next hop may be an intermediate slave node 602 (S2) along the tunnel from S3 to the master node 601. The outer label 620 may comprise a tunnel distinguisher (or ID) that specifies the tunnel extending between S3 and the master node 601. The inner label 630 may comprise a port distinguisher (or ID) that specifies a port on the master node 601. The L2 header 640, the L3 header 650, and the PDU 660 may not be changed.

S3 may then forward the packet to the next hop, S2 602. S2 602 may receive the packet and encapsulate the packet by adding a URF header with new values in the packet. Specifically, the second L2 header 610 may comprise a new destination MAC address that indicates the next hop for forwarding the packet and a new source MAC address that indicates S2 602. The next hop may be a second intermediate slave node S1 602 along the tunnel from S3 to the master node 601. The outer label 620 and the inner label 630 in the second L2 header 610 may remain the same. S2 602 may not process or modify the L2 header 640, the L3 header 650, and the PDU 660. S2 602 may then send the packet to the next hop, S1, which may process the packet similar to S2 602. Thus, S1 may encapsulate the packet using a new URF header by modifying the destination and source MAC addresses in the second L2 header 610 without the outer label 620 and the inner label 630. S2 602 may also leave the L2 header 640, the L3 header 650, and the PDU 660 intact. When the packet is received at the master node 601, the master node 601 may examine the URF header and determine based on the inner label 630 that the packet has reached the intended port. The master node 601 may decapsulate the packet by removing the URF header, including the second L2 header 610, the outer label 620, and the inner label 630 from the packet. Further, the master node 601 may update the L2 header 640 in the packet to indicate a destination MAC address corresponding to the CR that the packet is designated for and a source MAC address corresponding to the master node 601. The master node 601 may identify the CR based on the destination IP address in the L3 header 650. The packet may then be sent to the core network 604, where the CR is located.

The URF header encapsulation scheme 600 may be implemented similarly for a URF arranged in a hub and spoke topology. In the a hub and spoke topology, the upstream packet may be sent from a slave node to a master node directly (without passing through intermediate nodes) and subsequently forwarded to a CR associated with the destination address of the packet.

For instance, the packet may be forwarded in the URF from a first slave node, via a first master node, a second slave node, and a second master node, to a third slave node, which may be arranged in that sequence along the ring. The master nodes may perform the routing and forwarding functions by processing the packet (at both L2 and L3 headers) as described above in the schemes 500 and 600, while the slave nodes may implement a simpler logic using URF header encapsulation. The master nodes may process the packet at L2/L3 by reconfiguring MAC addresses in a L2 header based on IP addresses in a L3 header of the original packet (e.g., non-encapsulated packet), such as described in the schemes 500 and 600 above. However, the slave nodes may not modify the L2 and L3 headers of the original packet. Both the master nodes and the slave nodes may encapsulate the original packet may encapsulating corresponding URF headers that include a second L2 header, an outer label, and an inner label, as described above.

The first slave node may receive the packet from outside the URF, encapsulate the packet with a URF header, and forward the packet (along a tunnel) in the URF to the first master node. The first master node may decapsulate the packet by removing the URF header from the packet, process the packet at L2/L3, encapsulate the packet with a new URF header, and forward the packet to the second slave node. The second slave node may encapsulate the URF header using similar logic as the first slave node and send the packet to the second master node. The second master node may perform the same logic and the first master node and send the packet to the third slave node. The third slave node may decapsulate the packet by removing the URF header, and then forward the packet outside the URF (on the port indicated in the URF header).

Figure 7:
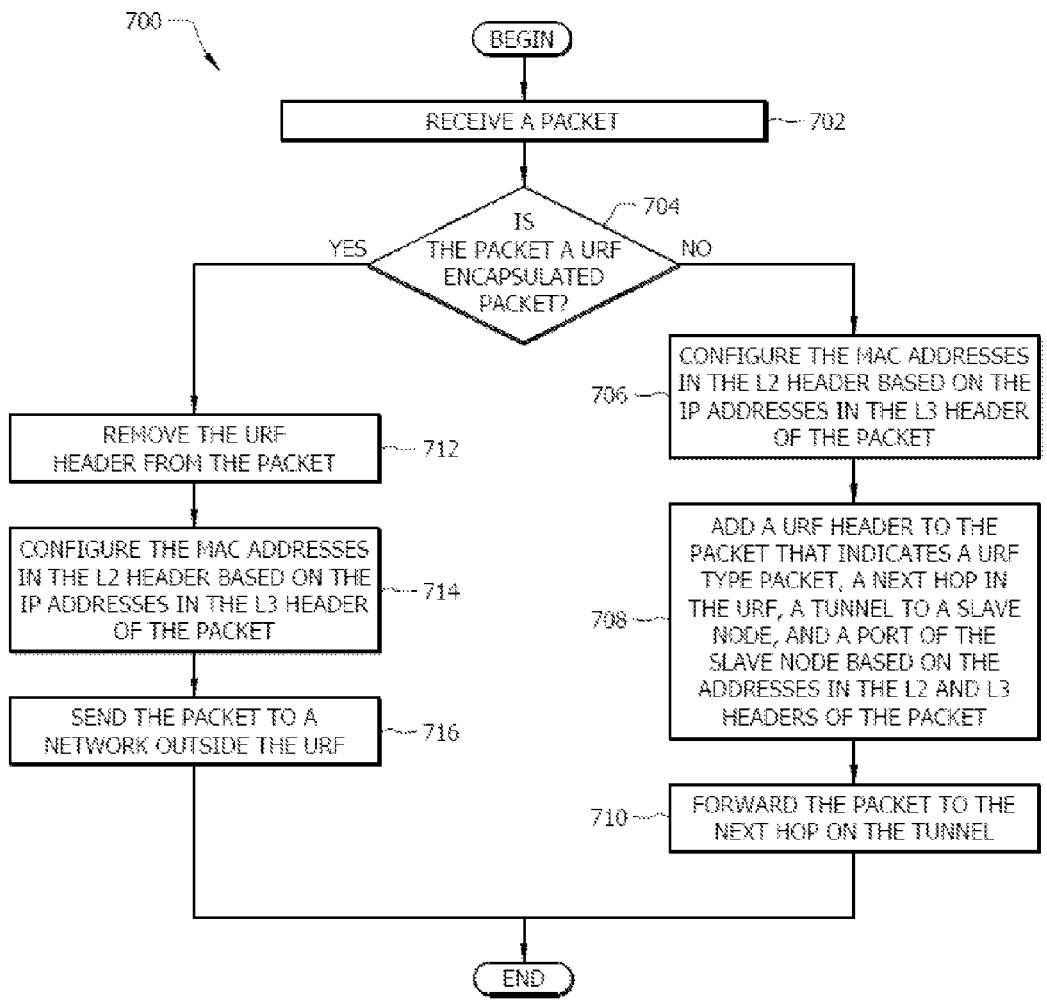
FIG. 7 is a flowchart of a URF header encapsulation method implemented by a master node according to an embodiment of the disclosure.

FIG. 7 illustrates an embodiment of a URF header encapsulation method 700, which may be implemented by a master node in a URF. The method 700 may be implemented at the master node for handling a downstream packet from a core network similar to the scenario of scheme 500, or for handling an upstream packet from a previous hop in the URF similar to the scenario of scheme 600. The method 700 may begin at block or step 702, where a packet may be received. The master node may receive a downstream packet from outside the URF, e.g. a core network, of from inside the URF, e.g., from a slave node. At decision block 704, the method 700 may determine whether the packet is a URF encapsulated packet. The master node may examine an Ethertype in the L2 header of the packet to determine the type of the packet. For instance, the URF packet may be an upstream packet from a previous hop in the URF. Alternatively, the packet may be a non URF downstream packet received from a core network.

If the packet is a URF packet, then the method 700 may proceed to block 712. Otherwise, the method 700 may proceed to block 706. At block 706, the master node may configure the MAC addresses in the L2 header of the packet based on the IP addresses in the L3 header of the packet. For example, a received downstream packet may comprise a L2 header that indicates the master node as the destination MAC address and a CR as the source MAC address. The master node may change the source MAC address in the L2 header to indicate the master node and change the destination MAC address to indicate a UE. The UE may correspond to an IP destination address in the L3 header of the packet.

At block 708, the master node may add a URF header to the packet that indicates a URF type packet, a next hop in the URF, a tunnel to a slave node, and a port of the slave node based on the addresses in the L2 and L3 headers of the packet. The URF header may comprise a L2 header that comprises an Ethertype that indicates the URF packet type, a source MAC address that indicates the master node, and a destination MAC address that indicates a next hop on the URF, which may be a slave node. The URF header may also comprise an outer label that comprises a distinguisher for a tunnel that leads to a destination slave node for sending the packet outside the URF, and an inner label that comprises a port distinguisher on the slave node. At block 710, the packet may be forwarded to the next hop on the tunnel. The method 700 may then end.

At block 712, the URF header may be removed from the packet. At block 714, the master node may configure the MAC addresses in the L2 header of the packet based on the IP addresses in the L3 header of the packet. For example, a received upstream packet may comprise a L2 header that indicates the master node as the destination MAC address and a UE as the source MAC address. The master node may change the source MAC address in the L2 header to indicate the master node and change the destination MAC address to indicate a CR in a core network. The CR may correspond to an IP destination address in the L3 header of the packet. At block 716, the packet may be sent to a network outside the URF, e.g., a core network coupled to the master node. The method 700 may then end.

Figure 8:
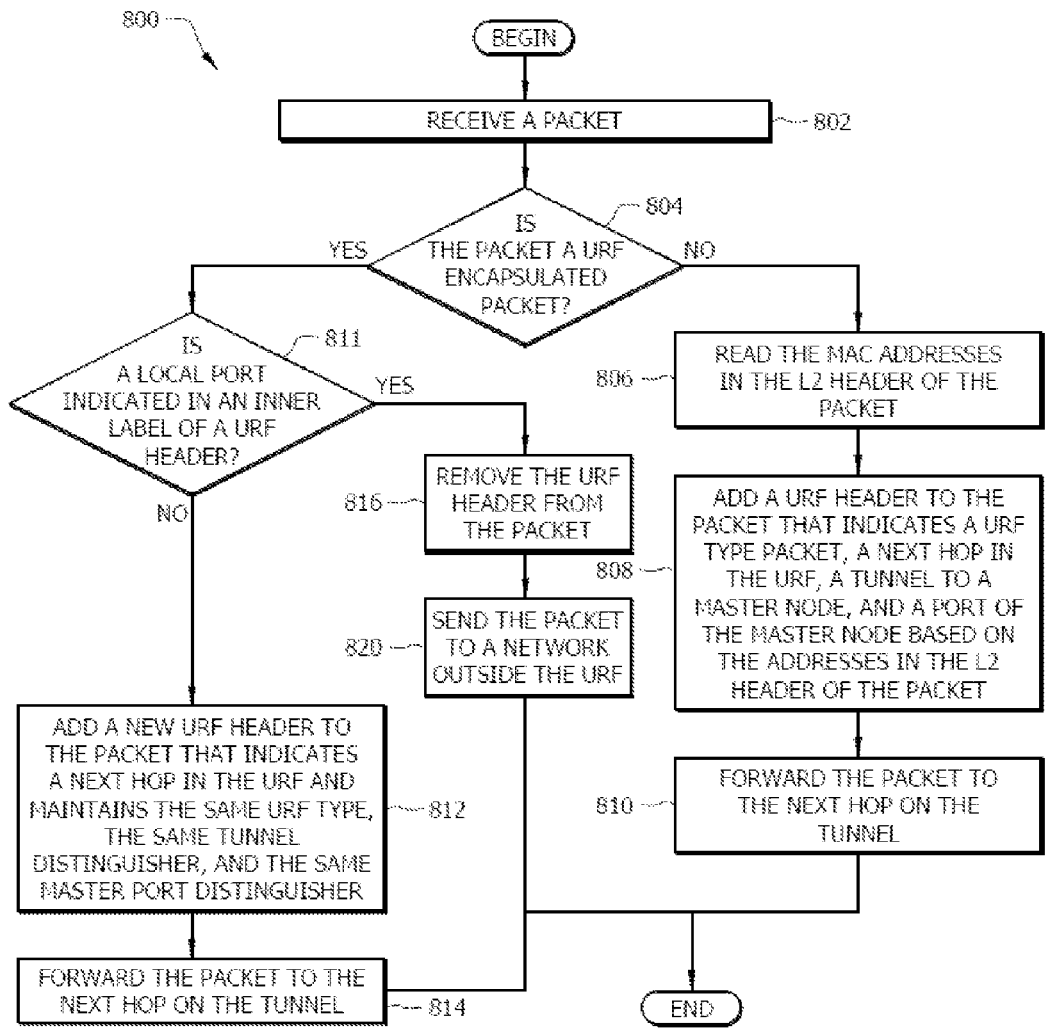
FIG. 8 is a flowchart of a URF header encapsulation method implemented by a slave node according to an embodiment of the disclosure.

FIG. 8 illustrates an embodiment of a URF header encapsulation method 800, which may be implemented by a slave node in a URF. The method 800 may be implemented at the slave node for handling an upstream packet from an IP RAN similar to the scenario of scheme 600, or for handling a downstream packet from a previous hop in the URF similar to the scenario of scheme 500. The method 800 may begin at block or step 802, where a packet may be received. The slave node may receive an upstream packet from outside the URF, e.g. an IP RAN via a BS, or from inside the URF, e.g., from a master node or another slave node. At decision block 804, the method 800 may determine whether the packet is a URF encapsulated packet. The slave node may examine an Ethertype in the L2 header of the packet to determine the type of the packet. For instance, the URF packet may be a downstream packet from a previous hop in the URF. Alternatively, the packet may be a non URF upstream packet received from an IP RAN.

If the packet is a URF packet, then the method 800 may proceed to block 811. Otherwise, the method 800 may proceed to block 806. At block 806, the slave node may read the MAC addresses in the L2 header of the packet. For example, the L2 header may comprise a source MAC address that indicates a UE coupled to the slave node via a BS and an IP RAN, and a destination MAC address that indicates a master node in the URF. At block 808, the slave node may add a URF header to the packet that indicates a URF type packet, a next hop in the URF, a tunnel to a master node, and a port of the master node based on the addresses in the L2 header of the packet. The URF header may comprise a L2 header that comprises an Ethertype that indicates the URF packet type, a source MAC address that indicates the slave node, and a destination MAC address that indicates a next hop on the URF, which may be a slave node. The URF header may also comprise an outer label that comprises a distinguisher for a tunnel that leads to a destination master node for sending the packet outside the URF, and an inner label that comprises a master port distinguisher on the master node. At block 810, the packet may be forwarded to the next hop on the tunnel. The method 800 may then end.

At decision block 811, the method 800 may determine whether a local port is indicated in an inner label in a URF header of the URF packet. The slave node may verify whether the inner label in the URF header of the packet matches or corresponds to a local port at the slave node. If the condition in block 811 is true, then the method 800 may proceed to block 816. Otherwise, the method 800 may proceed to block 812. At block 816, the URF header may be removed from the packet. The slave node may decapsulate the packet by removing the URF header before sending the packet on its local port as indicated by the removed inner label. At block 820, the packet may be sent to a network outside the URF. For example, the slave node may send the decapsulated packet on the designated port to an IP RAN via a BS. The method 800 may then end.

At block 812, the slave node may add a new URF header to the packet that indicates a next hop in the URF and maintains the same URF type, the same tunnel distinguisher, and the same master port distinguisher. For example, a new L2 header in the new URF header may comprise a source MAC address that indicates the slave node and a destination MAC address that indicates a next hop in the URF. At block 814, the packet may be forwarded to the next hop on the tunnel. The method 800 may then end.

In an embodiment, a URF header encapsulation scheme may be used for forwarding packets from an ingress slave node to an egress master node, e.g., via intermediate nodes. The ingress slave node and the egress slave node may be coupled to a tunnel, e.g., in a URF ring topology. The ingress slave node may receive a packet from outside the URF, such as via an ingress BS of an IP RAN, and forward the packet in the URF. The packet may be forwarded in the URF via one or more master and slave nodes from the ingress slave node to the egress slave node. The egress slave node may then receive the packet and send the packet outside the URF, such as via an egress BS in the same or different IP RAN.

Figure 9:
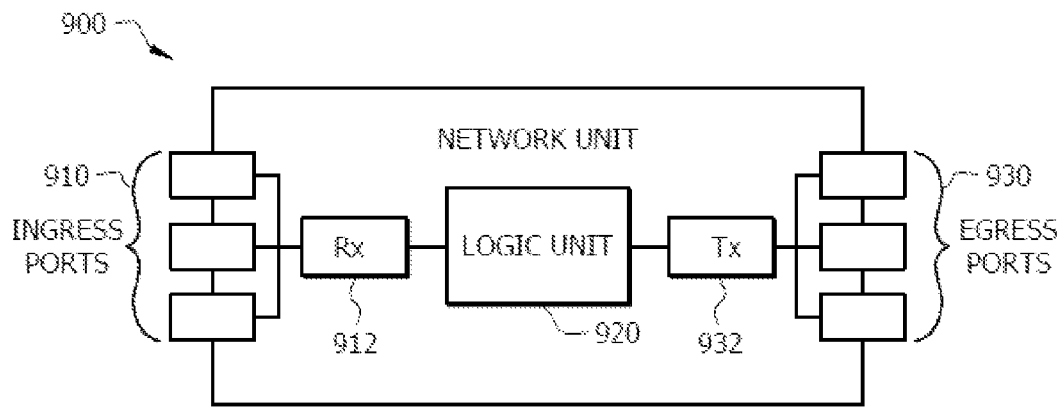
FIG. 9 is a schematic diagram of a network unit.

FIG. 9 illustrates an embodiment of a network unit 900, which may be located at or coupled to any of the components described above. For example, the network unit 900 may be located at or coupled to any of the slave nodes and master nodes described above. The network unit 900 may be any device that transports data through the network. For instance, the network unit 900 may correspond to or may be located in any of the network nodes described above, e.g., the first node 210 and the second node 220. The network unit 900 may comprise one or more ingress ports or units 910 coupled to a receiver (Rx) 912 for receiving signals and packets/data from other network components. The network unit 900 may comprise a logic unit 920 to determine which network components to send data to. The logic unit 920 may be implemented using hardware, software, or both. The network unit 900 may also comprise one or more egress ports or units 930 coupled to a transmitter (Tx) 932 for transmitting signals and packets/data to the other network components. The receiver 912, logic unit 920, and transmitter 932 may also implement or support the schemes and methods described above for packets encapsulation and forwarding in the URF. For instance, the receiver 912, logic unit 920, and transmitter 932 may be configured (via hardware and/or software) to implement or support the schemes and methods 500, 600, 700, 800, or combinations thereof.

Figure 10:
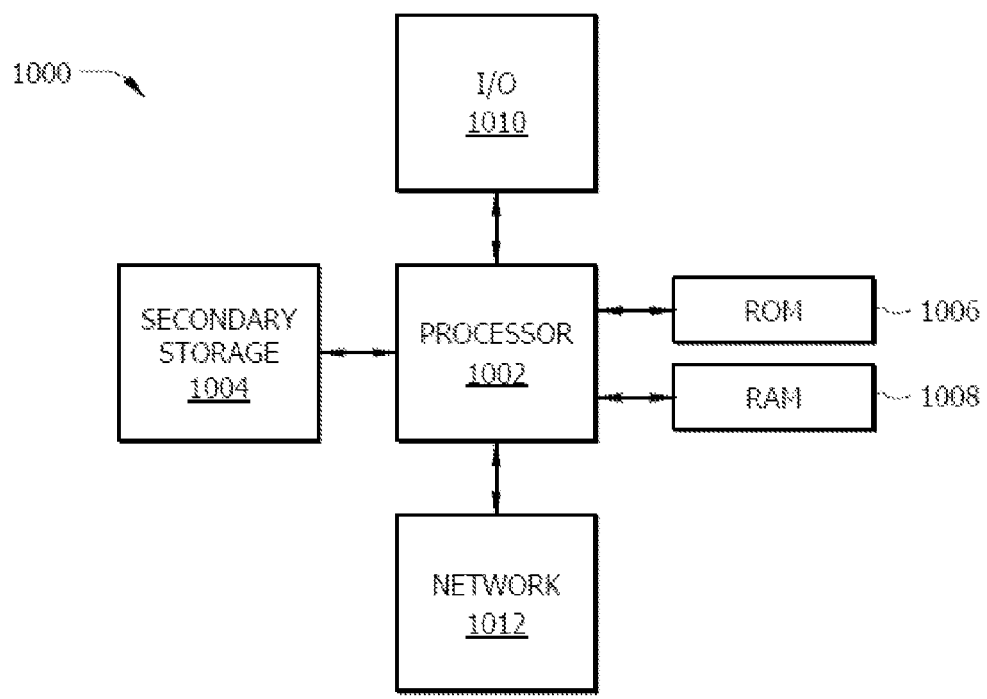
FIG. 10 is a schematic diagram of a general-purpose network component.

The network components described above may be implemented on any general-purpose network component, such as a computer or network component with sufficient processing power, memory resources, and network throughput capability to handle the necessary workload placed upon it. FIG. 10 illustrates a typical, general-purpose network component 1000 suitable for implementing one or more embodiments of the components disclosed herein. The network component 1000 includes a processor 1002 (which may be referred to as a central processor unit or CPU) that is in communication with memory devices including secondary storage 1004, read only memory (ROM) 1006, random access memory (RAM) 1008, input/output (I/O) devices 1010, and network connectivity devices 1012. The processor 1002 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 1002 may be configured to implement any of the schemes and methods described above for packets encapsulation and forwarding in the URF. For instance, the processor 1002 may be configured (via hardware and/or software) to implement or support the schemes and methods 500, 600, 700, 800, or combinations thereof.

The secondary storage 1004 is typically comprised of one or more disk drives or erasable programmable ROM (EPROM) and is used for non-volatile storage of data. Secondary storage 1004 may be used to store programs that are loaded into RAM 1008 when such programs are selected for execution. The ROM 1006 is used to store instructions and perhaps data that are read during program execution. ROM 1006 is a non-volatile memory device that typically has a small memory capacity relative to the larger memory capacity of secondary storage 1004. The RAM 1008 is used to store volatile data and perhaps to store instructions. Access to both ROM 1006 and RAM 1008 is typically faster than to secondary storage 1004.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 4, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 4 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. In a master node of a United Router Farm (URF), a method of packet forwarding comprising:
   receiving port information from a plurality of slave nodes in the URF;
   assigning port identifiers (IDs) to ports of the slave nodes based on the port information;
   establishing Multiprotocol Label Switching (MPLS) tunnels with the slave nodes;
   receiving a packet addressed for a destination slave node of the slave nodes;
   adding a URF header to the packet that uniquely identifies a destination port of the destination slave node by the port ID assigned by the master node, wherein the URF header comprises:
      an indicator that indicates the packet is a URF type packet;
      a next hop in the URF;
      an MPLS tunnel to the destination slave node; and
      the assigned port ID of the destination port of the destination slave node; and
   forwarding the packet toward the destination port via a next hop on the MPLS tunnel after adding the URF header.

2. The method of claim 1, wherein the packet comprises:
   a Layer Two (L2) header comprising a source Media Access Control (MAC) address and a destination MAC address; and
   a Layer Three (L3) header comprising an Internet Protocol (IP) address, and wherein the method further comprises:
   configuring the source MAC address in the L2 header to indicate the master node and the destination MAC address in the L2 header to indicate a user equipment (UE) corresponding to the IP address in the L3 header, wherein the MPLS tunnel to the slave node and the port of the slave node are determined based on the UE.

3. The method of claim 1 further comprising:
   receiving a second packet, wherein the second packet is a URF packet comprising a second URF header that uniquely identifies a second destination port of a destination node by a port ID assigned by the master node; and
   removing the second URF header from the second packet when the port ID of the second URF header is associated with a local port of the master node; and
   sending the second packet to a network outside the URF after removing the second URF header.

4. The method of claim 3 further comprising configuring a source Media Access Control (MAC) address in an existing Layer Two (L2) header in the second packet to indicate the master node and a destination MAC address in the existing L2 header to indicate a router of the network corresponding to an Internet Protocol (IP) address in an existing Layer Three (L3) header of the packet before sending the packet to the network.

5. The method of claim 1 further comprising determining that the packet is not a URF packet, wherein adding the URF header is in response to the determination.

6. The method of claim 1, wherein the packet comprises a Layer Two (L2) header that comprises Media Access Control (MAC) source and destination addresses, a Layer Three (L3) header that comprises source and destination Internet Protocol (IP) addresses, and a protocol data unit (PDU), and wherein the URF header comprises a second L2 header that comprises MAC addresses for current and next hops on the MPLS tunnel and an Ethertype the indicates a URF packet, an outer label that corresponds to the MPLS tunnel between the master node and the destination slave node, and an inner label that corresponds to a port on the destination slave node.

7. In a slave node of a United Router Farm (URF), a method of packet forwarding comprising:
   receiving a port identifier (ID) assigned by a URF master node that identifies a destination port of the master node;
   establishing a Multiprotocol Label Switching (MPLS) tunnel with the master node;
   receiving a packet addressed for the master node;

adding a URF header to the packet that uniquely identifies the master node destination port by the port ID, wherein the URF header comprises:
  an indication that the packet is a URF type packet;
  a next hop in the URF;
  the MPLS tunnel to the master node; and
  the port ID of the master node destination port; and
forwarding the packet toward the master node destination port via a next hop on the MPLS tunnel after adding the URF header.

8. The method of claim 7 further comprising reading a destination Media Access Control (MAC) address in an existing Layer Two (L2) header in the received packet to determine the master node.

9. The method of claim 7 further comprising:
receiving a second packet, wherein the second packet is a URF packet comprising a second URF header that comprises a port ID that identifies a second destination port; and
removing the second URF header from the second packet when the port ID of the second URF header is associated with a local port of the slave node; and
sending the second packet to a network outside the URF after removing the second URF header.

10. The method of claim 7 further comprising:
receiving a second packet, wherein the second packet is a URF packet comprising a second URF header that comprises a port ID that identifies a second destination port; and
replacing the second URF header in the packet when the port ID identifies the second URF header is not a local port of the slave node, wherein the replaced header indicates:
  a new next hop;
  the packet is a URF type packet;
  an MPLS tunnel to the master node; and
  the port ID of the master node destination port; and
forwarding the second packet to the new next hop on the MPLS tunnel after replacing the second URF header.

11. The method of claim 7 further comprising determining that the packet is not a URF packet, wherein adding the URF header is in response to the determination.

12. The method of claim 7, wherein the received packet is an Internet Protocol (IP) packet, MPLS packet, or an Ethernet packet.

13. A network component for supporting packet forwarding in a United Router Farm (URF), the network component comprising:
a receiver configured to receive a packet addressed for a destination node at an edge of the URF;
a processor coupled to the receiver and configured to encapsulate the packet using a URF header that uniquely identifies an egress port of the destination node by a port identifier (ID) assigned by a URF master node, wherein the URF header comprises:
  a URF Layer Two (L2) header that indicates Media Access Control (MAC) addresses of current and next hops;
  an outer label that indicates a MPLS tunnel to the destination node; and
  an inner label that indicates the port ID of the egress port of the destination node; and
a transmitter coupled to the processor and configured to send the packet to a next hop in the URF after encapsulating the packet.

14. The network component of claim 13, wherein the URF comprises one or more master nodes and one or more slave nodes that are arranged in a ring topology, and wherein the MPLS tunnel passes through at least some of the one or more master nodes and one or more of the slave nodes in sequence according to the ring topology.

15. The network component of claim 13, wherein the received packet is not a URF packet, and wherein the network component is a master node or a slave node of the URF.

16. The network component of claim 13, wherein the received packet is a URF packet, and wherein the packet is received at a master node or a slave node of the URF that modifies the URF header in the packet to update the current and next hops.

17. The network component of claim 13, wherein the packet is received at a master node of the URF from a core network coupled to the master node and is sent to a slave node of the URF.

18. The network component of claim 13, wherein the packet is received at a master node of the URF from a first slave node of the URF and is sent to a second slave node of the URF.

19. The network component of claim 13, wherein the packet is received at a first slave node of the URF from an Internet Protocol (IP) Radio Access Network (RAN) via a base station (BS) coupled to the first slave node and is sent to a second slave node or a master node of the URF.

20. The network component of claim 13, wherein the packet is received at a slave node of the URF and comprises another sent L2 header that indicates MAC addresses of a master node of the URF and a customer node that are not modified by the slave node.

21. The network component of claim 13, wherein the packet is a downstream packet received at a master node of the URF and comprises another sent L2 header that indicates MAC addresses of the master node and an external node, and wherein the master node reconfigures the L2 header to indicate the intended receiver of the packet at the end of the URF.

22. The network component of claim 13, wherein the receiver is further configured to receive a URF packet comprising a second URF header that includes a URF L2 header that indicates MAC addresses of current and previous hops, an outer label that indicates a MPLS tunnel to a second destination node in the URF, and an inner label that indicates an egress port on the second destination node, wherein the processor is further configured to decapsulate the URF packet by removing the URF header when the egress port of the inner label matches a local port of the network component, and wherein the transmitter is further configured to forward the packet outside the URF via the local port when the egress port of the inner label matches the local port.

* * * * *

UNITED STATES PATENT AND TRADEMARK OFFICE
CERTIFICATE OF CORRECTION

PATENT NO. : 8,948,179 B2
APPLICATION NO. : 13/591038
DATED : February 3, 2015
INVENTOR(S) : Katherine Zhao et al.

Page 1 of 1

It is certified that error appears in the above-identified patent and that said Letters Patent is hereby corrected as shown below:

In the claims:

Column 15, Lines 43-45, Claim 12, should read as:

--12. The method of claim 7, wherein the received packet is an Internet Protocol (IP) packet, a MPLS packet, or an Ethernet packet.--

Signed and Sealed this
Thirtieth Day of June, 2015

Michelle K. Lee
*Director of the United States Patent and Trademark Office*